J. CROWLEY.
Thrashing-Machine Beater.

No. 103,147. Patented May 17, 1870.

United States Patent Office.

JOHN CROWLEY, OF SPARTA, WISCONSIN.

Letters Patent No. 103,147, dated May 17, 1870.

IMPROVEMENT IN BEATERS FOR THRASHING-MACHINES.

The Schedule referred to in these Letters Patent and making part of the same.

*To all whom it may concern:*

Be it known that I, JOHN CROWLEY, of Sparta, in the county of Monroe, and State of Wisconsin, have invented a new and useful Beater for Thrashing-Machines; and I do hereby declare the following to be a full, clear, and exact description thereof, sufficient to enable others skilled in the art to which my invention appertains to make and use the same, reference being had to the accompanying drawing forming part of this specification, and in which—

Figure 1:
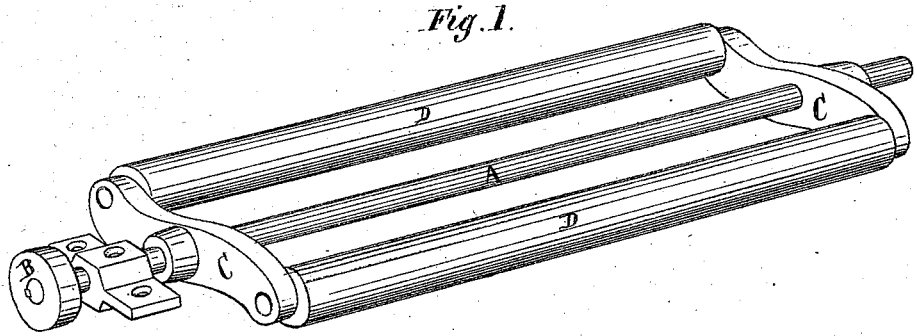

Figure 1 is a perspective view of one of my beaters, and

Figure 2:

Figure 2, an end view of the same.

Similar letters of reference indicate corresponding parts in both figures.

My invention consists in providing a rotary beater with longitudinal rollers.

In the drawings—

A represents the central rod or shaft, upon which the beater is mounted, and which is provided, at one end, with a driving-pulley, B.

C are the transverse arms or heads, attached to the shaft A, one being placed near each end.

These arms are constructed in a form somewhat similar to the letter S, as shown in fig. 2.

D represents the longitudinal rollers. The ends of these rollers are loosely mounted in the arms C, at a sufficient distance from the shaft A to produce the desired result in the operation of beating the straw.

Having thus described my invention,

I claim as new and desire to secure by Letters Patent—

The improved beater for thrashing-machines herein described, consisting of the shaft A, arms or heads C, and longitudinal rollers D, constructed to operate substantially as described.

JOHN CROWLEY.

Witnesses:
EUGENE SULLIVAN,
AMOS A. CARTER.